(No Model.)
R. McCORD.
VALVE FOR PNEUMATIC CYCLE TIRES.
No. 544,487. Patented Aug. 13, 1895.
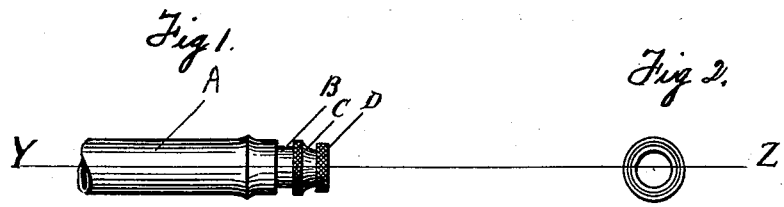
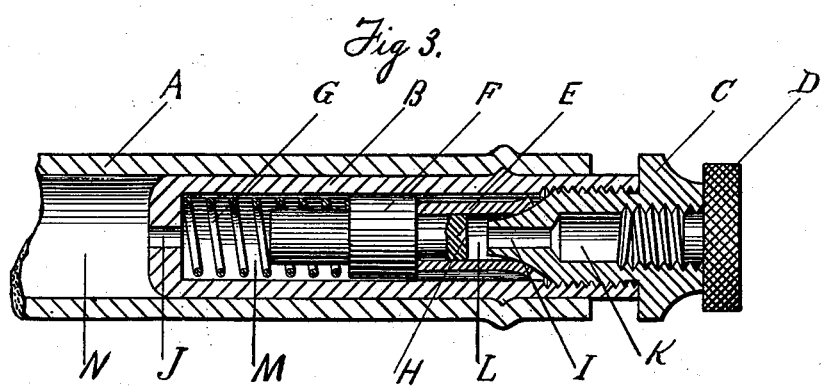
Witnesses
Chas. C. Campbell
Fred J. Gilly
Inventor
Ralph McCord

United States Patent Office.

RALPH McCORD, OF SPRINGFIELD, ILLINOIS.

VALVE FOR PNEUMATIC CYCLE-TIRES.

SPECIFICATION forming part of Letters Patent No. 544,487, dated August 13, 1895.

Application filed December 15, 1894. Serial No. 531,933. (No model.)

*To all whom it may concern:*

Be it known that I, RALPH McCORD, a citizen of the United States, residing at Springfield, county of Sangamon, State of Illinois, have invented a new and useful Improvement in Valves for Pneumatic Cycle-Tires, of which the following is a specification.

The object of my invention is to provide a simple, durable valve, easy of adjustment and repair, and to avoid the objectionable features inherent in the ones now in use. These results I obtain by the mechanism shown in the accompanying drawings.

Figures 1 and 2 are external views, Fig. 1 being a side and Fig. 2 an end view. Fig. 3 is a sectional view through Y Z of Figs. 1 and 2, on enlarged scale, showing interior mechanism.

Similar letters of reference indicate corresponding parts in the drawings.

A represents a rubber tube called the "stem." This tube passes through the rim of the wheel and connects with the tire. Within the tube A and closely fitting it is a hollow cylindrical metallic tube B, one end of which is threaded and receives the plug C, which is screwed into it, the shoulder of plug C and the end of cylinder B forming an air-tight union. Through the plug C is a hole K, terminating in the small hole I, which opens into the chamber L. The plug C has an inner thread which receives the plug D, which screws into it, the shoulder of D and end of C forming an air-tight union. Within the cylinder B is a plug or pin F, the middle portion of which nearly fills the chamber M. Both ends of plug F are reduced in size, as shown. One end of the plug F is encircled by a short piece of rubber tubing E, which fits tightly over it. The other end of plug F is encircled by spiral spring G, which tends to push the plug F forward and press the tube E against the cone-shaped point of the plug C, thus forming an air-tight chamber L within tube E. When the tire is to be inflated the plug D is removed and the tube of the air-pump inserted in its place. As the air passes through K and I into chamber L the tube E and plug F are forced back against spring G and the air passes on through chamber M and hole J into chamber N and enters the tire. After the tire is filled and the pumping stopped, the tube E is again pressed by spring G against the cone-shaped point of the plug C and prevents the air from escaping. It will readily be seen by the construction of this valve all of the interior mechanism can be removed and repairs made without taking the cylinder B out of stem A, as is necessary in the case of most other valves, although undesirable to do so. In order to deflate the tire the plug D is removed and a wire or pin passed through K and I and pressed against the end of pin F, which should have an indent H to receive the end of wire and prevent it from slipping against and injuring the tube E.

Heretofore in most valves for cycle-tires airtight joints are formed by subjecting a piece of rubber or other material to severe pressure. This soon makes it hard and destroys its pliability. It is evident that such is not the case with my valve. The end of tube E is pressed with yielding pressure against the cone-point of plug C. This contact slightly stretches the mouth of the tube, and the back pressure of the air upon the outside of the tube E closes it down firmly upon the cone-point and prevents escape of air without the severe mechanical pressure generally employed. It will readily be seen that this construction, whereby the elastic quality of rubber or other material is utilized in the manner indicated by contact of tube E with plug C, is a radical departure from the construction of other valves and has the advantages already named. It is evident that many modifications of this valve may be made without departing from my invention. In fact, the spring G is not strictly necessary, as the pin F can be extended to the inner end of chamber M. In that case, as the air enters from the pump the mouth of tube E opens and admits the air. A soft, pliable, hollow hemisphere and a convex valve-seat, or a convex valve-seat and a soft elastic strip stretched over it, or numerous other modifications may be substituted for the cone C and the tube E. I do not, therefore, confine myself to this exact construction; but, Having described my invention, what I do claim as new, and desire to cover by Letters Patent, is—

1. In a valve for the purpose specified, the combination of a cone shaped or convex valve seat and a soft pliable non-compressed, tube which is detached from its seat substantially as shown.

2. In a valve for the purpose specified, a cylinder of metal or other suitable material having a plug secured to its outer end the inner end of the said plug forming a valve seat in combination with a soft pliable tube forming a valve, the said tube having a limited amount of longitudinal movement within the cylinder substantially as shown.

3. In a valve for the purpose specified, the combination of a cylinder B, a plug C secured in one end of the cylinder, a tube E within the cylinder, and embracing one end of the plug; and a spring G adapted to press the tube against the plug, substantially as shown.

RALPH McCORD.

Witnesses:
CHAS. C. CAMPBELL,
FRED. I. GETTY.